(12) United States Patent
Dreischarf et al.

(10) Patent No.: US 11,466,700 B2
(45) Date of Patent: Oct. 11, 2022

(54) FAN CASING AND MOUNT BRACKET FOR OIL COOLER

(71) Applicant: UNISON INDUSTRIES, LLC, Jacksonville, FL (US)

(72) Inventors: Derek Thomas Dreischarf, Bellbrook, OH (US); Jason Levi Burdette, Beavercreek, OH (US); Walter Arthur Hundley, Enon, OH (US); Bernard Albert Luschek, Lebanon, OH (US)

(73) Assignee: Unison Industries, LLC, Jacksonville, FL (US)

( * ) Notice: Subject to any disclaimer, the term of this patent is extended or adjusted under 35 U.S.C. 154(b) by 991 days.

(21) Appl. No.: 15/445,240

(22) Filed: Feb. 28, 2017

(65) Prior Publication Data

US 2018/0245605 A1  Aug. 30, 2018

(51) Int. Cl.

| | |
|---|---|
| *F04D 29/52* | (2006.01) |
| *F04D 29/64* | (2006.01) |
| *F04D 29/58* | (2006.01) |
| *F02C 7/14* | (2006.01) |
| *F02K 3/105* | (2006.01) |
| *F02K 3/06* | (2006.01) |
| *F04D 29/66* | (2006.01) |
| *F01D 25/24* | (2006.01) |

(52) U.S. Cl.
CPC .............. *F04D 29/644* (2013.01); *F02C 7/14* (2013.01); *F02K 3/105* (2013.01); *F04D 29/522* (2013.01); *F04D 29/582* (2013.01); *F04D 29/584* (2013.01); *F01D 25/246* (2013.01); *F02K 3/06* (2013.01); *F04D 29/668* (2013.01); *F05D 2220/36* (2013.01); *F05D 2230/60* (2013.01); *F05D 2260/213* (2013.01); *F05D 2260/30* (2013.01); *F05D 2300/436* (2013.01)

(58) Field of Classification Search
CPC ....... B64D 29/06; F01D 25/28; F01D 25/243; F01D 25/246; F02C 7/14; F28F 9/0075
See application file for complete search history.

(56) References Cited

U.S. PATENT DOCUMENTS

| | | | |
|---|---|---|---|
| 5,387,082 A * | 2/1995 | Matyscak | F01D 11/005 415/209.2 |
| 6,814,538 B2 * | 11/2004 | Thompson | F01D 11/08 415/173.1 |
| 8,052,385 B2 | 11/2011 | Thompson et al. | |
| 8,601,791 B2 | 12/2013 | Bajusz et al. | |
| 8,944,751 B2 | 2/2015 | Winn et al. | |
| 9,062,553 B2 * | 6/2015 | Baumas | F01D 9/042 |

(Continued)

FOREIGN PATENT DOCUMENTS

| | | |
|---|---|---|
| CN | 1840865 A | 10/2006 |
| CN | 101085597 A | 12/2007 |

(Continued)

*Primary Examiner* — Justin D Seabe
(74) *Attorney, Agent, or Firm* — McGarry Bair PC

(57) ABSTRACT

A turbine engine for an aircraft can includes a casing. The casing can be a fan casing surrounding a fan assembly for drawing air into the turbine engine. The fan casing can have a peripheral wall. A surface cooler can be provided in the turbine engine confronting the peripheral wall of the fan casing. The surface cooler can have a mounting bracket for mounting the surface cooler to the fan casing.

20 Claims, 10 Drawing Sheets

(56) References Cited

U.S. PATENT DOCUMENTS

| | | | |
|---|---|---|---|
| 9,353,649 B2 * | 5/2016 | Rioux | F01D 25/246 |
| 9,404,507 B2 | 8/2016 | Scarr et al. | |
| 9,759,077 B2 * | 9/2017 | Beichl | F16J 15/3288 |
| 9,932,901 B2 | 4/2018 | Sener | |
| 10,138,734 B2 | 11/2018 | Jaureguiberry et al. | |
| 2007/0277752 A1 | 12/2007 | Smith et al. | |
| 2010/0068041 A1 * | 3/2010 | Nigmatulin | F01D 9/04 |
| | | | 415/173.1 |
| 2011/0146944 A1 | 6/2011 | Hand et al. | |
| 2012/0285138 A1 | 11/2012 | Todorovic | |
| 2013/0011246 A1 | 1/2013 | Todorovic | |
| 2013/0052007 A1 | 2/2013 | Durocher et al. | |
| 2014/0044525 A1 * | 2/2014 | Storage | F28F 3/12 |
| | | | 415/144 |
| 2014/0116059 A1 | 5/2014 | Benz et al. | |
| 2014/0127006 A1 | 5/2014 | Romanov et al. | |
| 2014/0271154 A1 | 9/2014 | Floyd et al. | |
| 2015/0135726 A1 * | 5/2015 | Hundley, Jr. | F02C 7/12 |
| | | | 60/796 |
| 2017/0023017 A1 | 1/2017 | Dreischarf et al. | |

FOREIGN PATENT DOCUMENTS

| | | |
|---|---|---|
| CN | 103233784 A | 8/2013 |
| CN | 103790712 A | 5/2014 |
| CN | 104097782 A | 10/2014 |
| CN | 204283516 U | 4/2015 |
| CN | 105189937 A | 12/2015 |
| CN | 106150571 A | 11/2016 |
| EP | 1898069 A2 | 8/2007 |
| EP | 1916399 A2 | 10/2007 |

\* cited by examiner

FAN CASING AND MOUNT BRACKET FOR OIL COOLER

BACKGROUND OF THE INVENTION

Contemporary engines used in aircraft produce substantial amounts of heat that must be transferred away from the engine in one way or another. Heat exchangers provide a way to transfer heat away from such engines. For example, heat exchangers can be arranged in a ring about a portion of the engine.

Oil can be used to dissipate heat from engine components, such as engine bearings, electrical generators, and the like. Heat can be convectively transferred from the oil to air by air-cooled oil coolers, and more particularly, surface air-cooled oil cooler systems to maintain oil temperatures at a desired range from approximately 100° F. to 300° F. In many instances, an environment can be as low as −65° F. In order to utilize the broadest temperature gap in cooling the oil, the oil can be routed to heat exchanges mounted to have the greatest convective contact with the environment.

BRIEF DESCRIPTION OF THE INVENTION

In one aspect, the disclosure relates to a fan casing assembly including a fan casing having a peripheral wall. The fan casing assembly also includes a surface cooler having a first surface confronting the peripheral wall and has forward and aft projections. The forward and aft projections are radially spaced from the first surface and are located between the peripheral wall and the first surface. The fan casing assembly further includes a mounting bracket having a monolithic body with a first axial edge having a first channel and a second axial edge spaced from the first axial edge and having a second channel. The monolithic body fixes to the peripheral wall. The mounting bracket retains the forward and aft projections within the first channel and the second channel, respectively, to mount the surface cooler to the fan casing.

In another aspect, the disclosure relates to a surface cooler bracket including a bracket body having a first axial edge with a first channel and a second axial edge spaced from the first axial edge and including a second channel. The surface cooler bracket includes a set of wear attenuators where a wear attenuator of the set of wear attenuators is located within the first channel or the second channel. The wear attenuator includes an elongated body having an integral feature configured to fasten the wear attenuator to the bracket body. The surface cooler bracket is configured to mount a surface cooler to a fan casing of a turbine engine by retaining a first hook and a second hook extending from the surface cooler within the set of wear attenuators.

In yet another aspect, the disclosure relates to a fan casing assembly including an annular fan casing having a peripheral wall and opposing forward and aft edge with at least one fan casing fastener opening passing through the peripheral wall. The fan casing assembly includes an annular surface cooler having a first surface confronting the peripheral wall and having opposing forward and aft edges, with corresponding forward and aft hooks. The hooks are radially spaced from the first surface and located between the peripheral wall and the first surface. The fan casing assembly further includes a mounting bracket. The mounting bracket includes a bracket body having a first axial edge with a first channel, and a second axial edge spaced from the first axial edge where the second axial edge includes a second channel and at least one mounting bracket fastener opening corresponding to the fan casing fastener opening. The mounting bracket further includes a first attenuator located within the first channel and defining a first slot with at least one integral attachment feature configured to fasten the wear attenuator to the bracket body, and a second wear attenuator located within the second channel and defining a second slot, with at least one integral attachment feature configured to fasten the wear attenuator to the bracket body. The forward and aft hooks are retained within the first slot and the second slot, respectively, and a fastener extends through the corresponding fan casing fastener opening and mounting bracket fastener opening to retain the annular surface cooler to the annular fan casing.

DESCRIPTION OF EMBODIMENTS OF THE INVENTION

Embodiment disclosed herein relate to surface coolers and more particularly to a mounting bracket for coupling surface coolers to a casing in an engine such as an aircraft engine. The exemplary surface coolers can be used for providing efficient cooling. Further, the term "surface coolers" as used herein can be used interchangeably with the term "heat exchangers." As used herein, the surface coolers with mounting brackets are applicable to various types of applications such as, but not limited to, turbojets, turbo fans, turbo propulsion engines, aircraft engines, gas turbines, steam turbines, wind turbines, and water turbines.

Current mounting brackets for surface coolers are complex and can include as many as 16 parts or more. Typical mounting brackets require assembly both prior to and during coupling to the surface cooler. Such mounting brackets can be expensive and labor intensive, while requiring significant maintenance. Many precision machined, bonded, and assembled components are required for the current mounting bracket. The current mounting bracket with its complex assembly has many opportunities for defects and long-term failures, as well as requiring significant cost.

Figure 1:
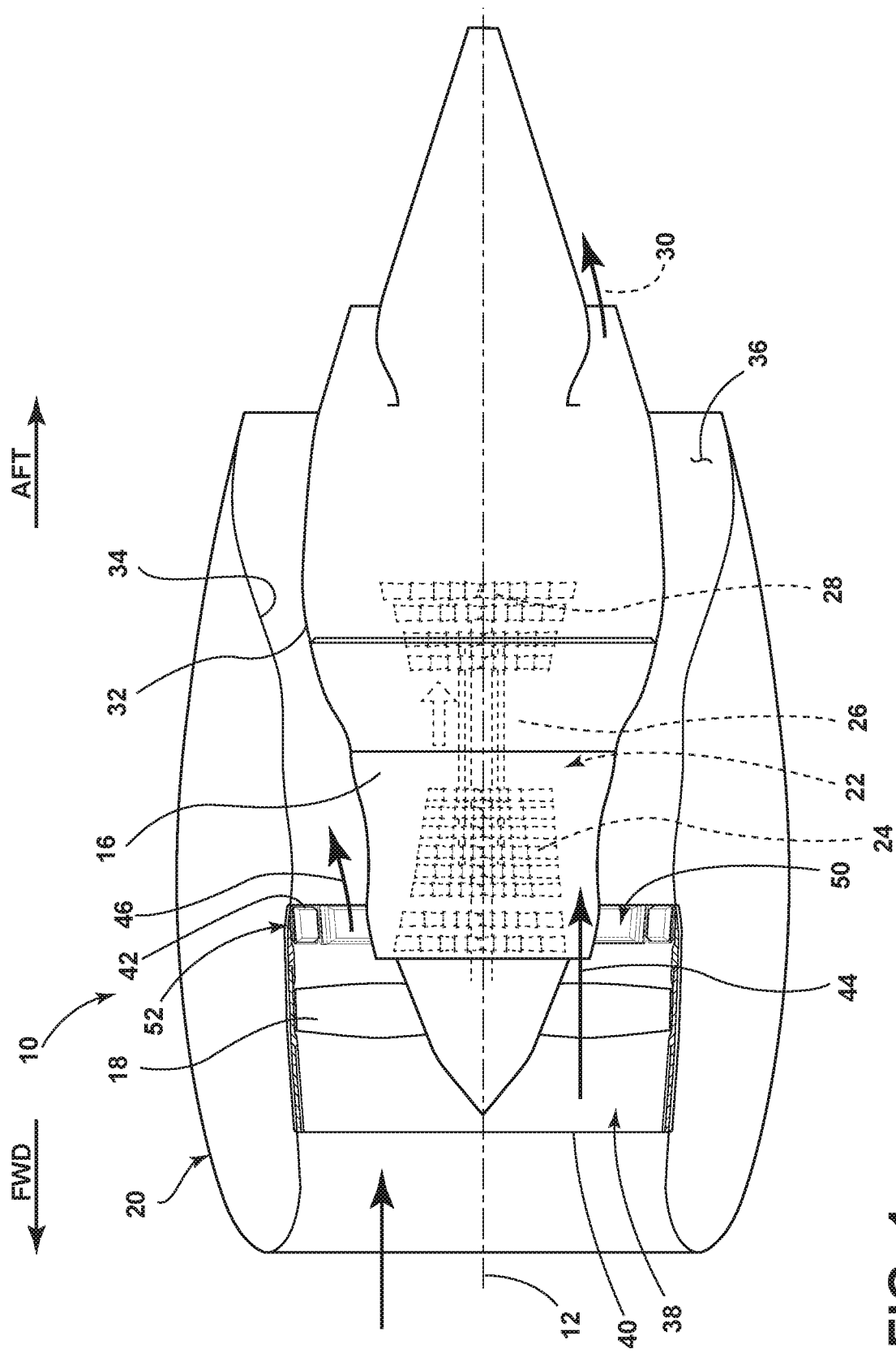
FIG. 1 is a schematic view of a turbine engine assembly with a surface cooler and mounting system according to aspects of the invention.

Aspects of the present disclosure have a simplified design and will result in reduced defects and rework, while reducing overall cost. As the mounting bracket can be configured for use in an oil cooling system of an aircraft engine, FIG. 1 provides a brief explanation of the environment in which embodiments of the invention can be used is described. More specifically, FIG. 1 illustrates an exemplary turbine engine assembly 10 having a longitudinal axis defining an engine centerline 12. A turbine engine 16, a fan assembly 18, and a nacelle 20 can be included in the turbine engine assembly 10. The turbine engine 16 can include an engine core 22 having compressor(s) 24, combustion section 26, turbine(s) 28, and exhaust 30. An inner cowl 32 radially surrounds the engine core 22.

Portions of the nacelle 20 have been cut away for clarity. The nacelle 20 surrounds the turbine engine 16 including the inner cowl 32. In this manner, the nacelle 20 forms an outer cowl 34 radially surrounding the inner cowl 32. The outer cowl 34 is spaced from the inner cowl 32 to form an annular passage 36 between the inner cowl 32 and the outer cowl 34. The annular passage 36 characterizes, forms, or otherwise defines a nozzle and a generally forward-to-aft bypass airflow path. A fan casing assembly 38 having an annular forward casing 40 and an aft casing 42 can form a portion of the outer cowl 34 formed by the nacelle 20 or can be suspended from portions of the nacelle 20 via struts (not shown).

In operation, air flows through the fan assembly 18 and a first portion 44 of the airflow is channeled through compressor(s) 24 wherein the airflow is further compressed and delivered to the combustion section 26. Hot products of combustion (not shown) from the combustion section 26 are utilized to drive turbine(s) 28 and thus produce engine thrust. The annular passage 36 is utilized to bypass a second portion 46 of the airflow discharged from fan assembly 18 around engine core 22.

The turbine engine assembly 10 can pose unique thermal management challenges and a heat exchanger system or surface cooler 50 can be attached to the turbine engine assembly 10 to aid in the dissipation of heat. In the exemplary embodiment, the surface cooler 50 can be an annular fan surface cooler 50 that can be operably coupled to an annular fan casing 52 having an annular peripheral wall 54 (FIG. 2) that forms an interior portion of the outer cowl 34. The surface cooler 50 can be any suitable cooler including an air-cooled oil cooler. The fan casing 52, in non-limiting examples, can be the fan casing assembly 38, or the forward casing 40 or aft casing 42. It should be appreciated that the fan casing 52 can be any casing region, such that the casing encloses any structural hardware that is part of the annular duct defined by the fan casing assembly 38. Thus, the surface cooler 50 can couple to the fan casing 52 at any position along the duct defined by the casing assembly 38.

The surface cooler 50 can include, but is not limited to, an air-cooled heat exchanger that is positioned on the fan casing 52. While the surface cooler 50 has been illustrated as being downstream of the fan assembly 18, and mounted to the aft portion of the fan casing 52, it is also contemplated that the surface cooler 50 can alternatively be upstream from fan assembly 18, or at any position along the outer cowl 34 or the fan casing 52. Further still, while not illustrated, the surface cooler 50 can be located adjacent the inner cowl 32. As such, it will be understood that the surface cooler 50 can be positioned anywhere along the axial length of the annular passage 36.

Figure 2:
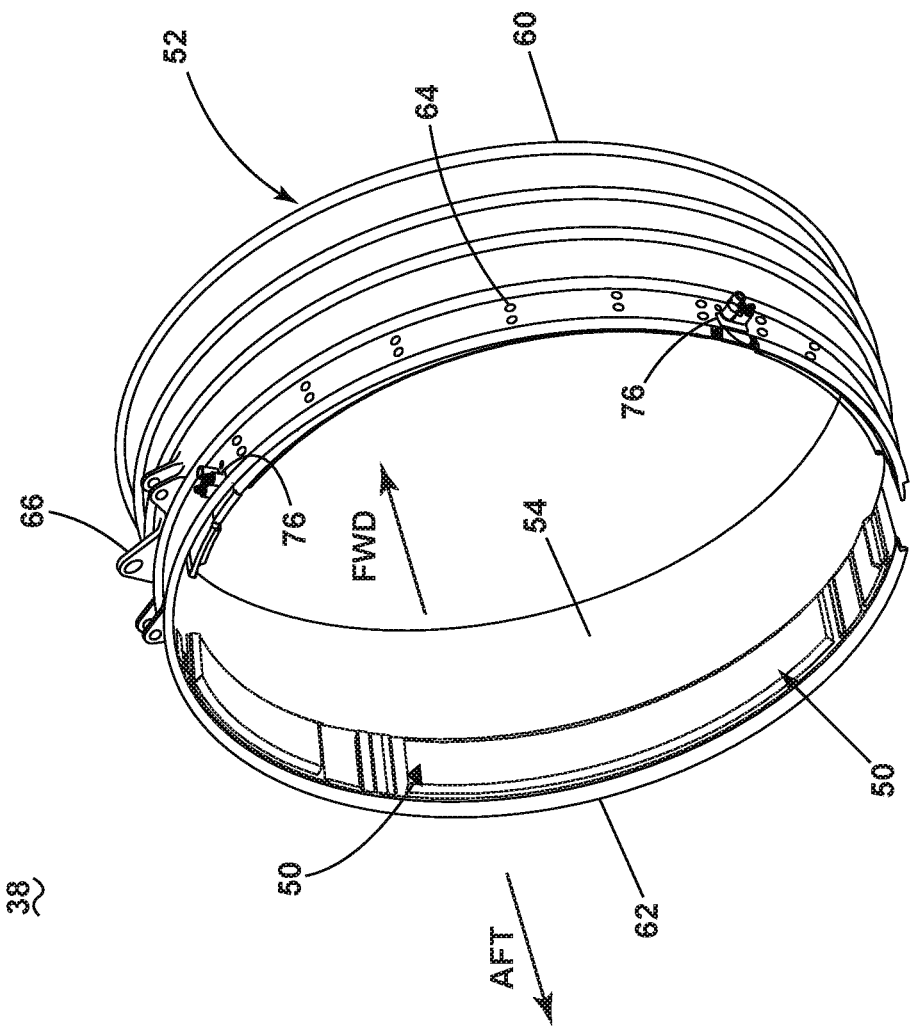
FIG. 2 is a perspective view of an aft portion of a casing with the surface cooler of FIG. 1 mounted thereto.

FIG. 2 illustrates one exemplary embodiment of the fan casing 52 of the fan casing assembly 38. The surface cooler 50 can cover any portion of the peripheral wall 54, and is not limited to the size as illustrated. It will be understood that a set of surface coolers 50 can be utilized to cool a single turbine engine assembly 10 (FIG. 1). It will be further understood that "a set" as used herein can include any number including only one. Such a set of surface coolers 50 can be disposed in axial arrangement along the peripheral wall 54. The fan casing 52 includes a forward edge 60 and an opposing aft edge 62. One or more fan casing fastener openings 64 and one or more manifold openings 76 pass through the peripheral wall 54. Casing mounts 66 can mount along the exterior of the fan casing 52 for mounting the fan casing 52. Such casing mounts 66 can include, but are not limited to, clevis mounts as illustrated.

Figure 3:
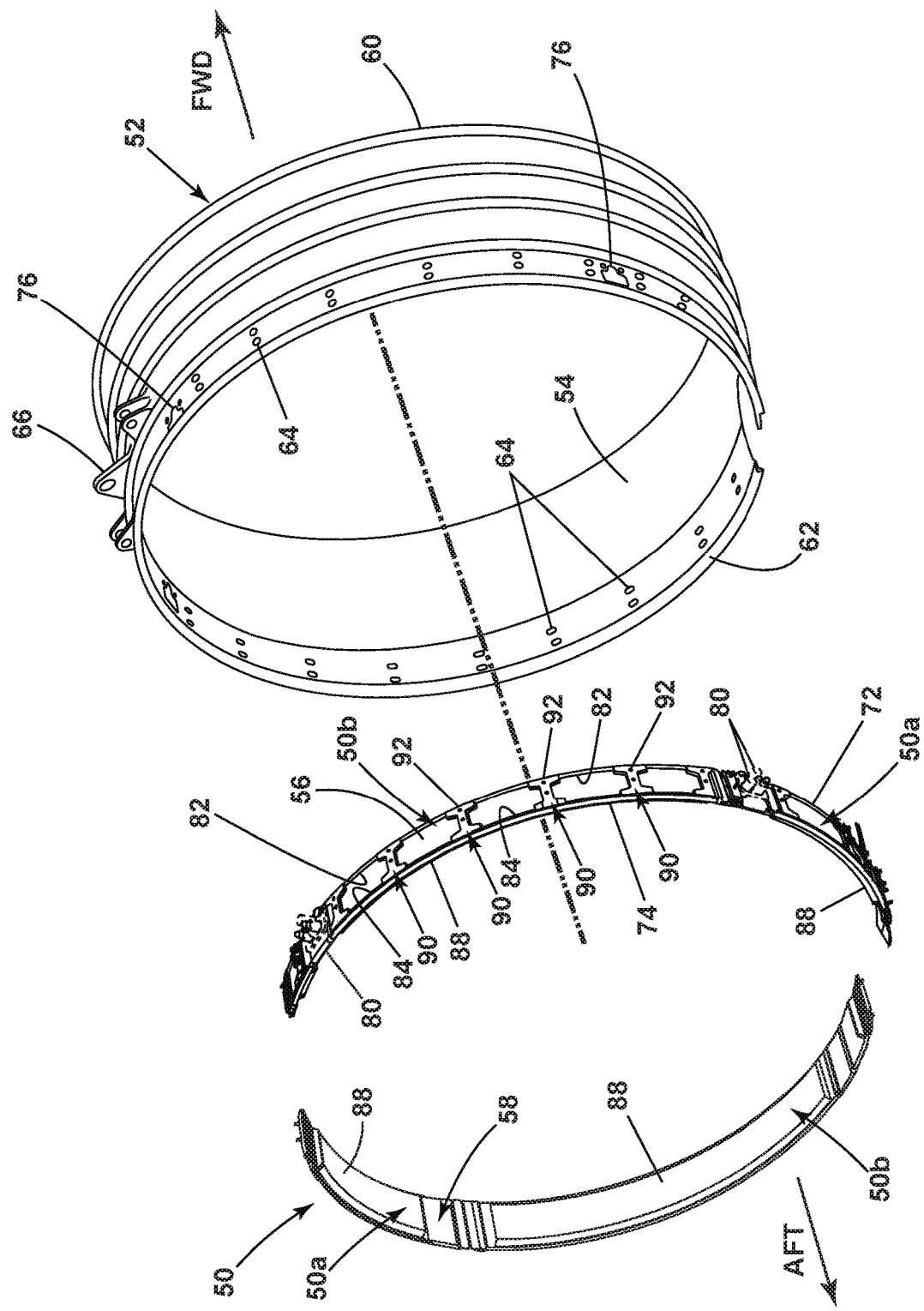
FIG. 3 is an perspective view of the surface cooler exploded from the casing of FIG. 2 including mounting brackets coupled to the surface cooler.

The exploded view of FIG. 3 illustrates the surface cooler 50 exploded from the fan casing 52. The surface cooler 50 as shown is a four-part surface cooler 50, including two integrated drive generator (IDG) coolers 50a and two engine lube coolers 50b, while it should be appreciated that the surface cooler 50 can be a single element, or the sum of any number of multiple separate surface coolers to form the annular surface cooler 50. The surface cooler 50 includes a first surface 56, which can confront the peripheral wall 54 at joining of the surface cooler 50 to the fan casing 52. The surface cooler 50 further includes and a second surface 58 opposite of the first surface 56. In the combined position, the second surface 58 of the surface cooler 50 forms a portion of the outer cowl 34 (FIG. 1). The surface cooler 50 includes a forward edge 72 and an opposing aft edge 74. The surface cooler 50 further includes a forward projection formed as a first hook 82 and an aft projection formed as a second hook 84. The first and second hooks 82, 84 are radially spaced from the first surface 56. In one particular example for positioning of the surface cooler 50 when assembled to the fan casing 52, the axial distance between the forward edge 72 of the surface cooler 50 and adjacent hardware can be less than or equal to 0.135 inches and the axial distance between the aft edge 74 and adjacent hardware can be 0.126 inches or less. Furthermore, a radial distance between the forward and aft hooks 82, 84 and the peripheral wall 54 in an installed position is less than 0.266 inches.

One or more cooler manifolds 80 are coupled to the first surface 56. The manifold openings 76 are adapted to receive the manifolds 80 at attachment of the surface cooler 50 to the peripheral wall 54 of the fan casing 52. While the surface cooler 50 is shown having two cooler manifolds 80, any number of cooler manifolds 80 are contemplated. A set of heat exchangers 88 mount along the second surface 58 of the surface cooler 50 and can partially form the second surface 58. In operation, the cooler manifolds 80 can provide a flow of oil to the heat exchanger pads 88 for transferring heat away from the engine 10 through convection, for example.

At least one bracket, such as a surface cooler bracket, is illustrated as a mounting bracket 90 coupled to the first surface 56 of the surface cooler 50. While shown as four mounting brackets 90, any number of mounting brackets are contemplated. The mounting brackets 90 couple to the surface cooler 50 along the first surface 56 inserted between the first and second hooks 82, 84. The mounting brackets 90 can have two mounting bracket fastener openings 92. The mounting bracket fastener openings 92 correspond to the fastener openings 64 and are adapted to align with the fastener openings 64 in the peripheral wall 54 for coupling the fan casing 52 to the surface cooler 50 at the mounting brackets 90.

Figure 4:
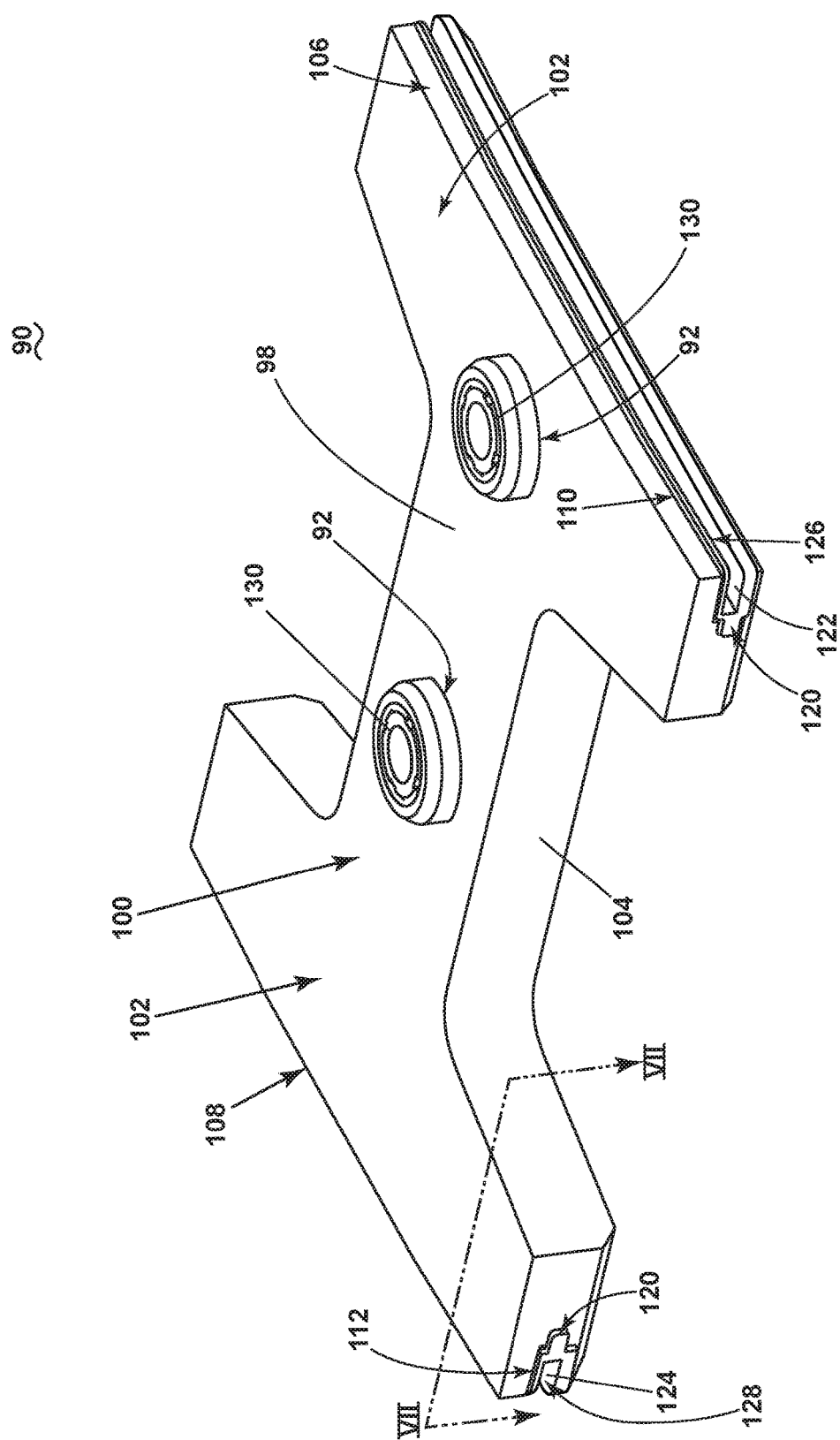
FIG. 4 is a top perspective view of one mounting bracket of FIG. 3.

FIG. 4 illustrates an enlarged view of a first surface 98 of the mounting bracket 90. The mounting bracket 90 includes a monolithic bracket body 100 having two opposing elongated ends 102 interconnected by a rib 104. A monolithic body 100 as used herein should be understood as including a single integral element to form the body, as opposed to formed as the sum of more than one joined element. Such formation can be accomplished, in non-limiting examples, through casting or additive manufacturing of the entire monolithic body 100. At the elongated ends 102, the body 100 terminates at a first axial edge 106 and a second axial edge 108. In one non-limiting example, the first axial edge 106 can be a forward edge and the second axial edge can be an aft edge. A first channel 110 and a second channel 112 are formed in the body 100 at first axial edge 106 and the second axial edge 108, respectively.

One or more wear attenuators 120 can be included in the mounting bracket 90. In the illustrated example, a first wear attenuator 122, having an elongated body, is provided in the first channel 110 and a second wear attenuator 124 having an elongated body is provided in the second channel 112. The first wear attenuator 122 defines a first slot 126 extending along the first axial edge 106 and the second wear attenuator 124 defines a second slot 128 extending along the second axial edge 108. The wear attenuators 120 can be made of any suitable material including, but not limited to, polyether ether ketone (PEEK). Suitable materials can include low-wear material, such as thermoplastics and polymers, to improve component lifetime and minimize required maintenance.

A set of fasteners 130 are provided in the mounting bracket fastener openings 92. Such fasteners 130 can be any suitable fastener including, but not limited to, a threaded fastener. The fasteners 130 can be configured to mount the surface cooler 50 (FIG. 3) to the peripheral wall 54 of the fan casing 52 at the mounting brackets 90.

Figure 5:
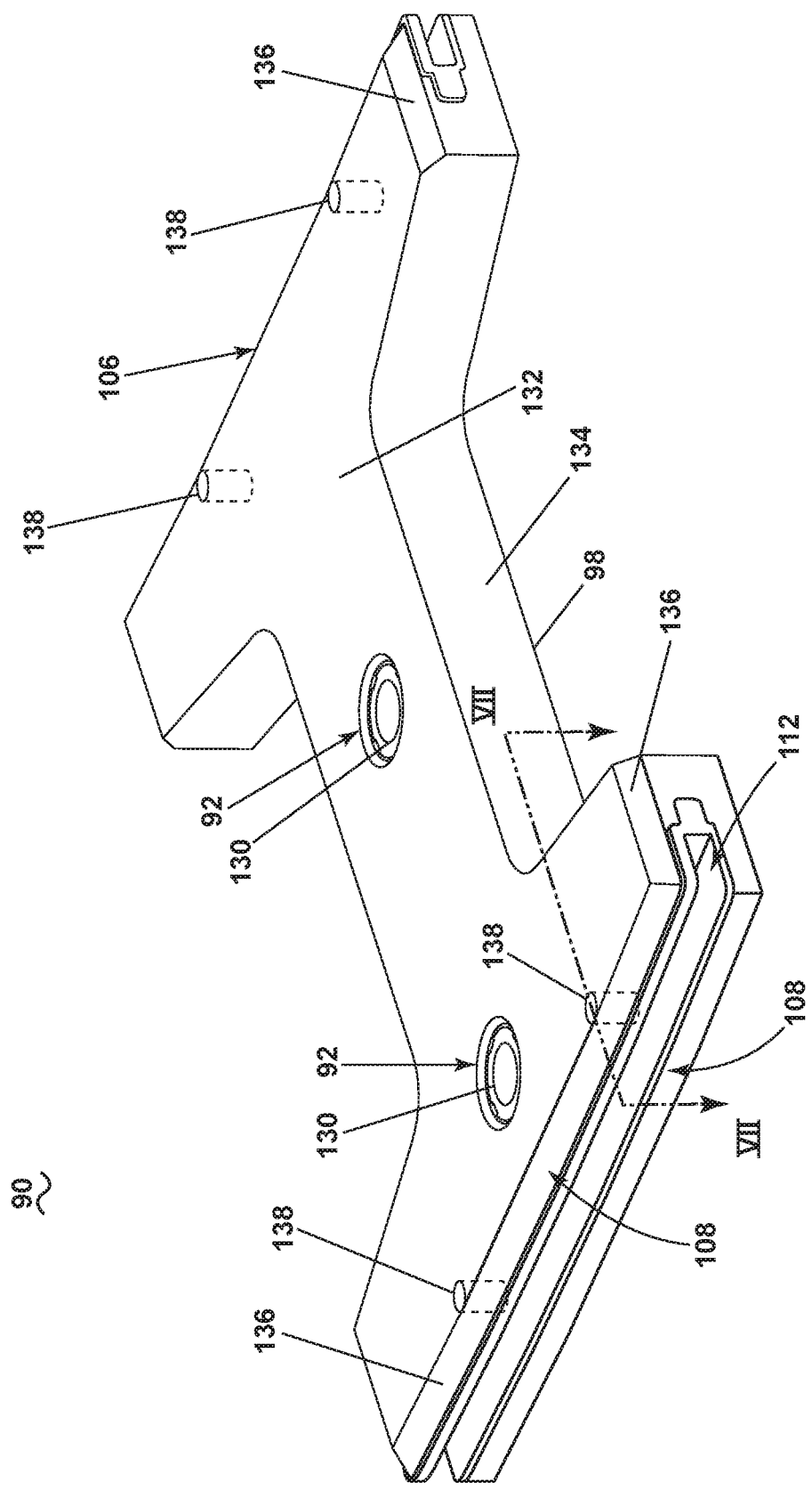
FIG. 5 is a bottom perspective view of one mounting bracket of FIG. 4.

FIG. 5 illustrates a second surface 132 of the mounting bracket 90 of FIGS. 3 and 4. Sidewalls 134 are provided between the topside first surface 98 and the second surface 132. A taper 136 can be included on the second surface 132 between the first axial edge 106 and the second axial edge 108 and a remainder of the second surface 132. The mounting bracket 90 further includes a set of apertures 138 formed in the second surface 132. The apertures 138 extend through the body 100 on the second surface 132 to the first and second channels 110, 112.

Figure 6:
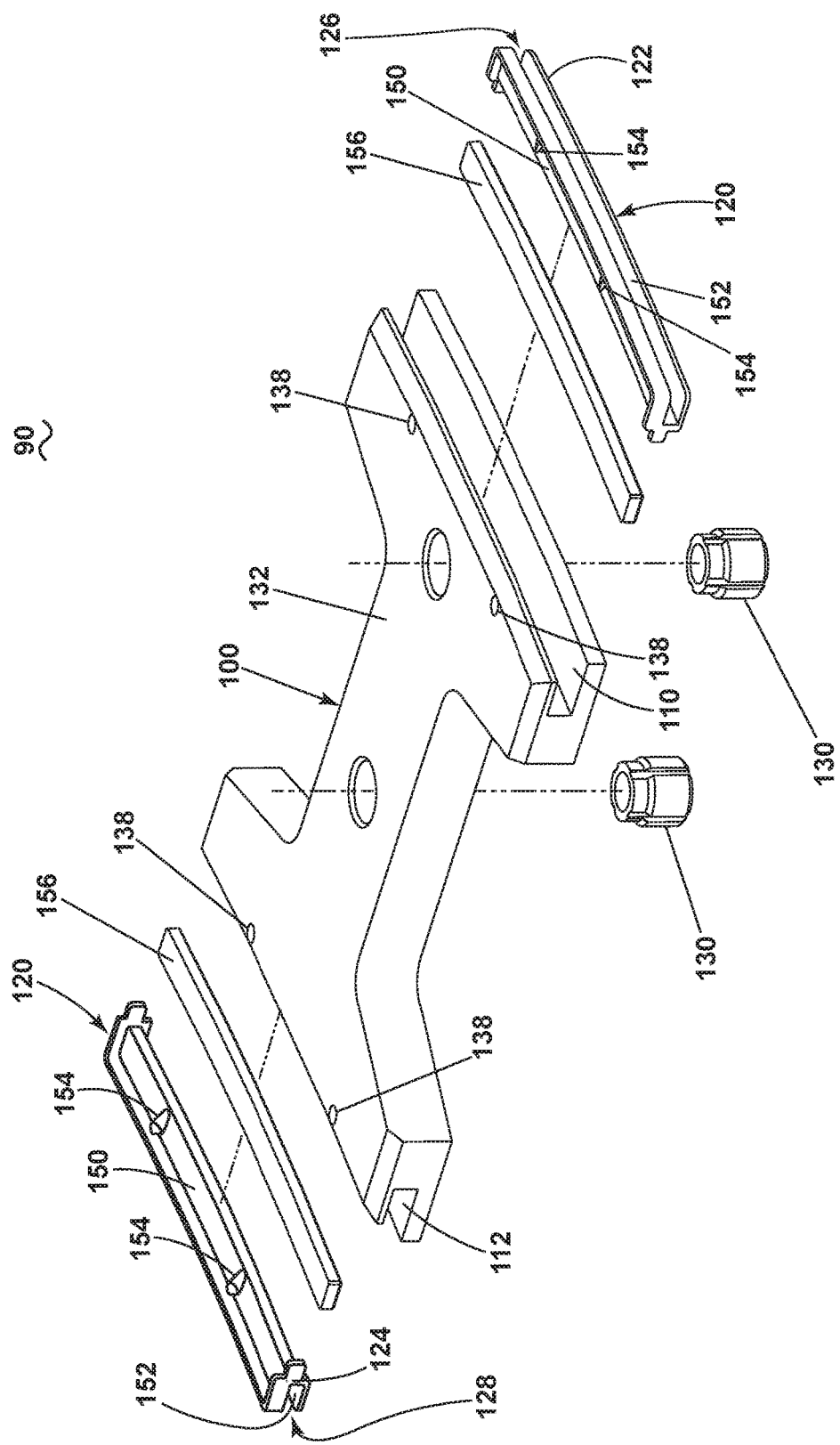
FIG. 6 is an exploded view of the mounting bracket of FIG. 5.

FIG. 6 illustrates an exploded, bottom perspective view of the mounting bracket 90 of FIG. 5, showing the second surface 132 of the mounting bracket 90. The first and second wear attenuators 122, 124 each include an exterior surface 150 and a U-shaped interior surface 152. When coupled to the mounting bracket 90, the exterior surface 150 is adjacent the first and second channels 110, 112 of the body 100 while the U-shaped interior surfaces 152 define the first and second slots 126, 128. One or more integral attachment features shown as protrusions 154 extend from the exterior surface 150 of each of the first and second wear attenuators 122, 124. The protrusions 154 are an integral attachment feature, configured to fasten the wear attenuators 122, 124 to the bracket body 100. More specifically, a protrusion 154 can mate with and extend into an aperture 138. Such fastening, in one non-limiting example, can be a snap-fit attachment of the wear attenuators 120 to the monolithic body 100, while any mechanical fastening is contemplated.

A set of vibration attenuators 156 can also be included in the mounting bracket 90. By way of non-limiting example, two vibration attenuators 156 have been illustrated. The vibration attenuators 156 can be made of any suitable material including, but not limited to, an elastomeric material, such as polymers, to permit flexion of the wear attenuators 122, 124 within the first and second channels 110, 112, while minimizing vibration at the first and second slots 126, 128. Additionally, the vibration attenuator 156 can be sized to pre-load the wear attenuators 122, 124.

At assembly, the vibration attenuator 156 and the first wear attenuator 122 can be inserted into the first channel 110. More specifically, the vibration attenuator 156 can be positioned within the first and second channels 110, 112 between the first and second wear attenuators 122, 124 and the body 100, opposite of the protrusions 154. Upon full insertion into the first channel 110, the protrusions 154 fasten at the apertures 138 at the first channel 110 to secure both the first wear attenuator 122 and the vibration attenuator 156 within the first channel 110. A similar assembly can be completed at the second channel 112. The protrusions 154 retain the wear attenuators 120 in the channels 110, 112, and the wear attenuators 120 retains the vibration attenuators 156 within the channels 110, 112.

Figure 7:
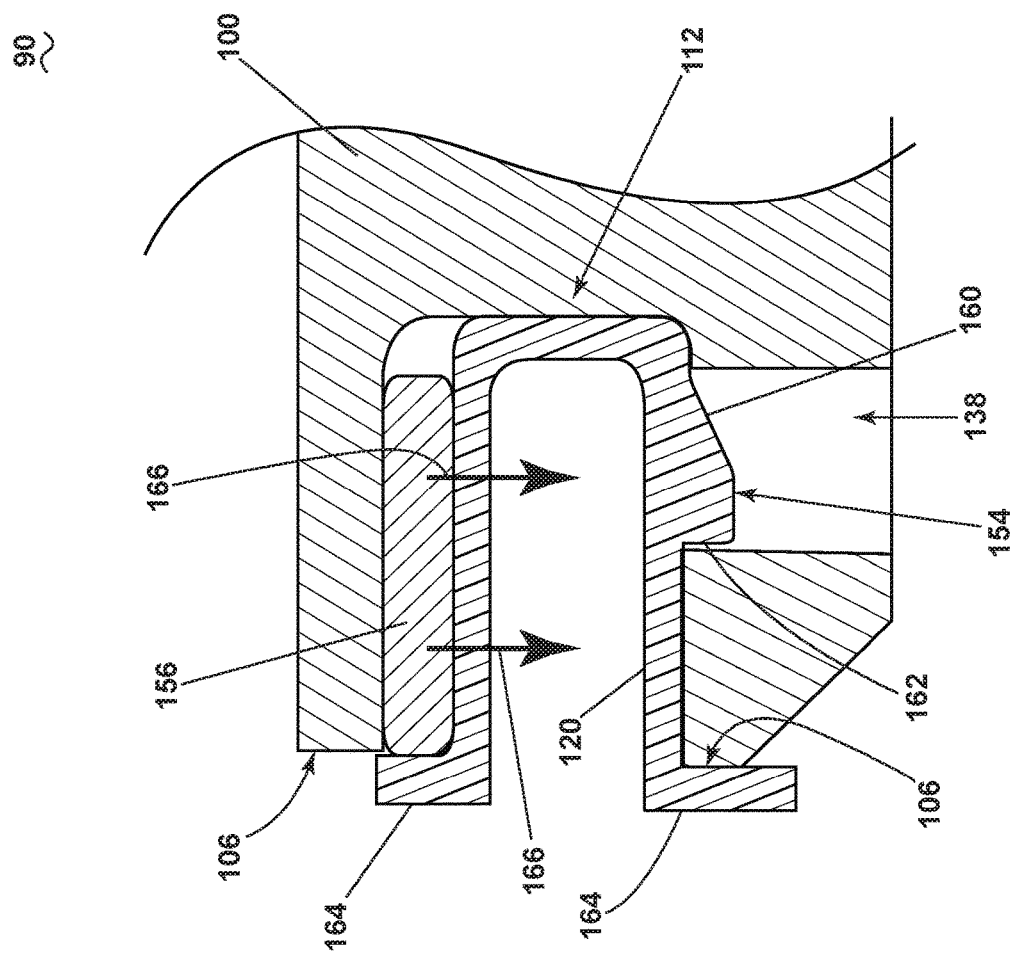
FIG. 7 is a cross-sectional view of the mounting bracket of FIG. 4 taken across section VII-VII.

Referring now to FIG. 7, a cross-sectional view of the mounting bracket assembly 90 taken along section VII-VII of FIG. 4 better shows the assembled wear attenuator 120 and vibration attenuator 156 within the second channel 112. While illustrated in reference to the second channel 112, it should be appreciated that the mounting bracket 90 can have an identical, mirrored assembly at the first channel 110. The protrusion 154 positions within the aperture 138 to secure the wear attenuator 120 to the second channel 112. The protrusion 154 includes a ramped back 160 and a flat front 162. The ramped back 160 permits slidable insertion of the protrusion 154 into the second channel 112 and ultimately into the aperture 138. The flat front 162 fastens the protrusion 154 within the aperture 138 and resists sliding out of the first channel 110. The wear attenuator 120 further includes front lips 164. The front lips overhang the first axial edge 106 of the body 100 and secures the vibration attenuator 156 within the second channel 112. The vibration attenuator 156 can be sized such that during installation the wear attenuators 122, 124 grip an inserted element with a frictional and compressive force. One such example can include a preload, illustrated by arrows 166. The preload can operate to compressively grip the hooks 82, 84 of FIG. 3, for example.

Figure 8:
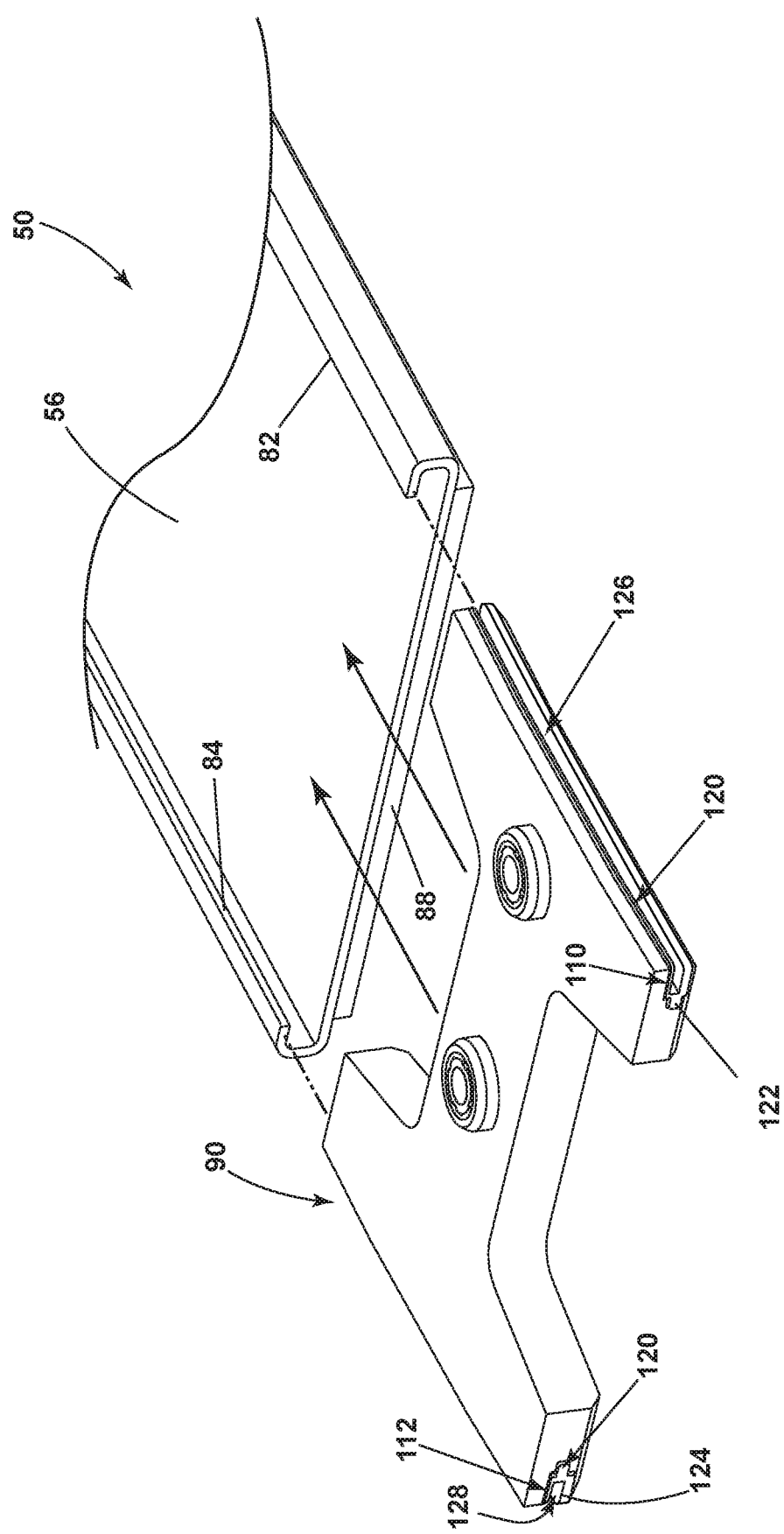
FIG. 8 is a perspective view of one mounting bracket of FIG. 4 being installed at the surface cooler of FIG. 3.

Referring now to FIG. 8, the mounting bracket 90 can be slid into engagement with the surface cooler 50 to assemble the mounting brackets 90 along the first surface 56. More specifically, the first channel 110 having the first wear attenuator 122 defining the first slot 126 receives the first hook 82 and slides along the first hook 82 such that the mounting bracket 90 is positioned along a first surface 56 of the surface cooler 50. The second channel 112 including the second wear attenuator 124 defines the second slot 128 to receive the second hook 84 and slide the mounting bracket 90 along the second hook 84.

As such, the first and second slots 126, 128 can guide the mounting bracket 90 onto surface cooler 50 during installation. The wear attenuators 120 and the vibration attenuator 156 (FIG. 7) are sized such that the first and second slots 126, 128 are smaller than the first and second hooks 82, 84. At installation, the vibration attenuator 156 preloads the wear attenuators 120 against the hooks 82, 84, to compressively and frictionally retain the mounting bracket 90 within the surface cooler 50. During operation, the vibration attenuators 156 remain flexible to permit thermal growth. Additionally, the wear attenuators 120 and the vibration attenuators 156 resist slidable movement of the surface cooler 50 in the circumferential direction relative to the fan casing 52, while remaining flexible for thermal growth.

The mounting bracket 90 as described provides for fixed dynamic loading and high cycle fatigue for the surface cooler 50 at the fan casing 52, while remaining flexible to permit thermal growth in the circumferential direction. The mounting bracket 90 includes a fewer number of parts, as compared to typical mounting brackets for surface coolers. The mounting bracket 90 is easily producible, installable, and reduces manufacturing cost. The preload provided by the wear attenuators 120 and the vibration attenuators 156 eliminates the need for adhesives to secure the brackets to the surface cooler or adhesives to form the mounting bracket itself. Additionally, the bracket 90 provides for decreased engine weight.

Figure 9:
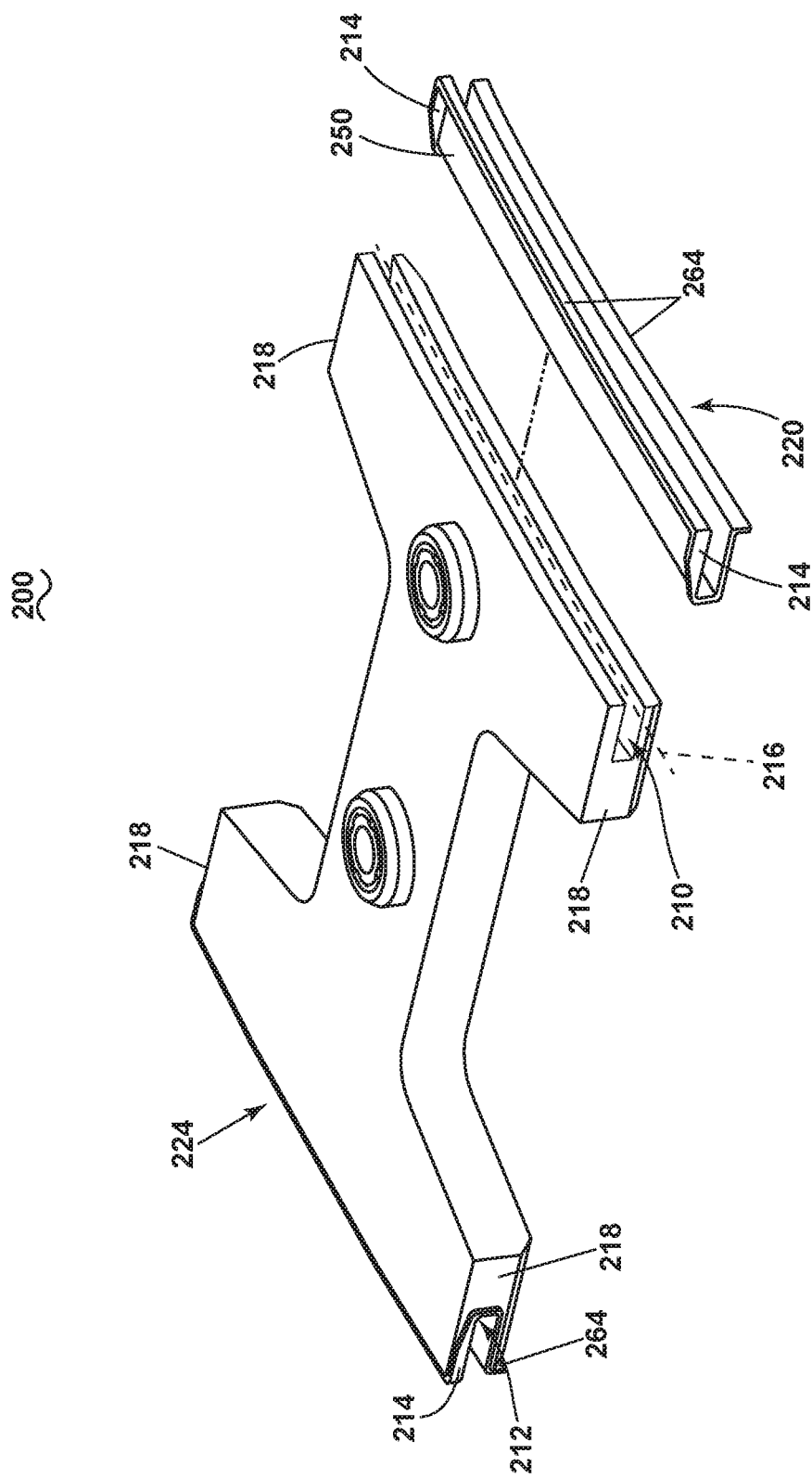
FIG. 9 is a top perspective view of an alternative mounting bracket having wear attenuators with end walls.

FIG. 9 illustrates an alternative wear attenuator 220 exploded from a first channel 210 of an alternative mounting bracket 200, which can be substantially similar to the mounting bracket 90 as described in FIGS. 3-8. The first channel 210 can define a longitudinal axis 216, which can be defined substantially in the circumferential direction relative to the engine centerline 12 of FIG. 1. The first channel 210 terminates at sidewalls 218 of the mounting bracket 200. The wear attenuator 220 includes end walls 214. The end walls 214 are formed as extensions of lips 264 extending around an exterior 250 of the wear attenuator 220. At insertion of the wear attenuator 220 into the first channel 210, the end walls 214 position along outside portions of the sidewalls 218 of the mounting bracket 200 such that the mounting bracket is slid between the end walls 214. The end walls 214 are adapted to prevent sliding movement of the wear attenuator 220 along the longitudinal axis 216, where the mounting bracket 200 may otherwise separate from the wear attenuator 220 due to forces generated during engine operation. As such, the protrusions 154 as discussed in FIGS. 6 and 7 can be optional, as the end walls 214 can secure the wear attenuator 220 within the first channel 210. Similarly, a second wear attenuator 224 having end walls 214 can be provided for a second channel 212 on the opposite side of the mounting bracket 200

Figure 10:
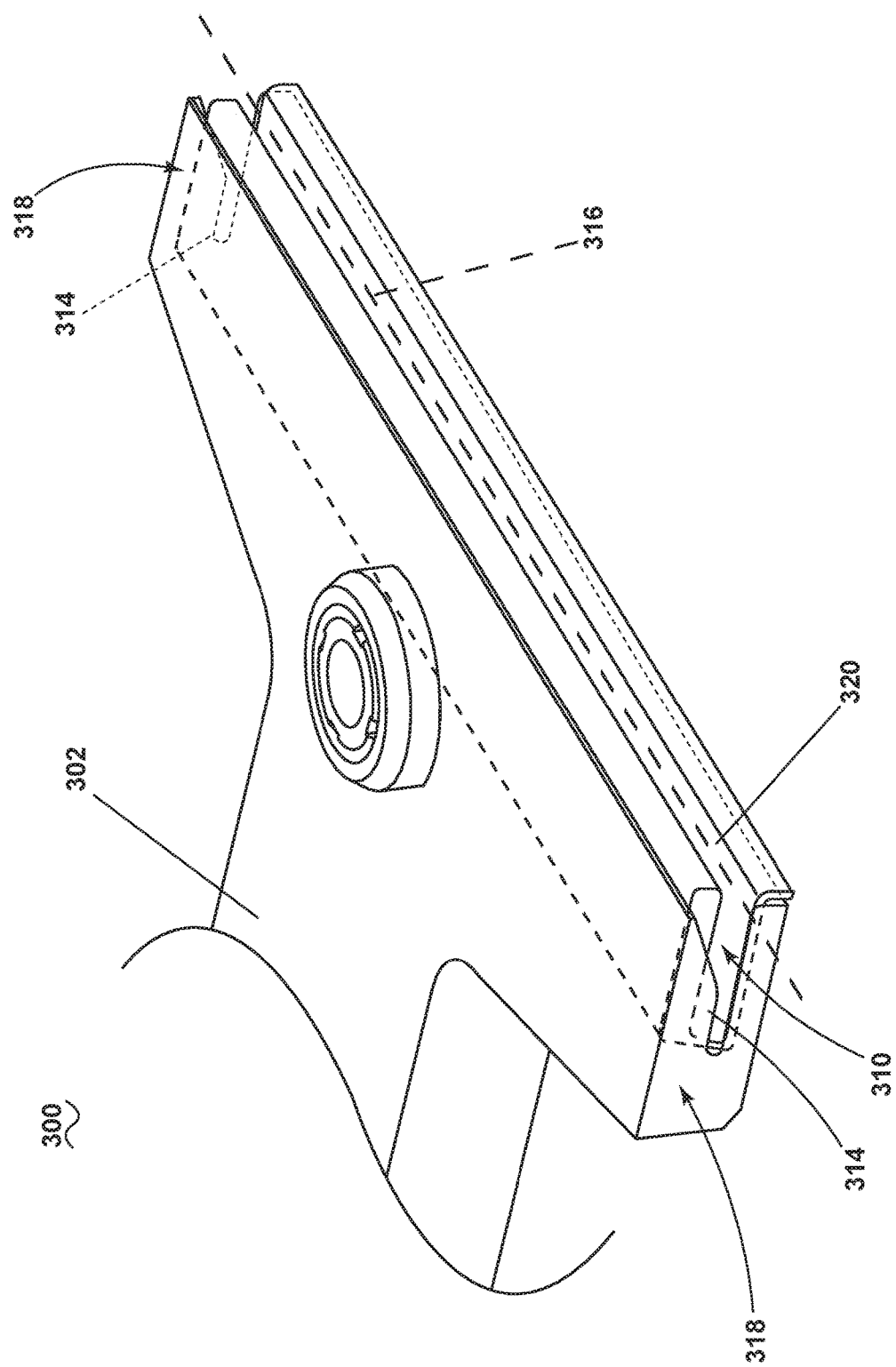
FIG. 10 is a top perspective view of another alternative mounting bracket having end walls encasing wear attenuators.

Alternatively, as shown in FIG. 10, a mounting bracket 300 can have sidewalls 318 including end walls 314 at least partially enclosing the first channel 310. In comparison to FIG. 9, the end walls 314 of FIG. 10 are integral with a body 302 of the bracket 300, as opposed to being integral with the wear attenuator 220, as shown and described in FIG. 9. The end walls 314 of FIG. 10 encase a wear attenuator 320 at the top and bottom of the first channel 310, preventing sliding movement of the wear attenuator 320 along a longitudinal axis 316, where the wear attenuator 320 may otherwise slide out of the first channel 310 of the mounting bracket 300. The end walls 314 should be sized to permit slidable assembly of the mounting bracket 300 along the first and second hooks 82, 84 of FIG. 3, while retaining the wear attenuator 320. Similar end walls 314 can be formed along a second channel to secure a second wear attenuator into the second channel. With the end walls 314, the protrusions 154 of FIGS. 6 and 7 can be optional, as the end walls 314 secure the wear attenuator 324 within the first channel 310.

Additionally, it should be appreciated that any of the components as described herein can be provided in a replaceable cartridge assembly for installation. More specifically, the wear attenuator, vibration attenuator, and bracket body can be pre-assembled to form such a cartridge assembly. Such a cartridge assembly can facilitate simplicity of replacement or servicing, as well as retrofitting existing assemblies. Such a cartridge assembly can reduce overall cost associated with installation, servicing, as well as manufacture as compared to current systems.

It should be further appreciated that the bracket as described herein provides for fixed dynamic loading, while remaining flexible for thermal loading during engine operation. The bracket improves upon existing brackets as improved reducibility and manufacturing, while facilitating installation, and being self-retained on the cooler assembly. The bracket provides for axial and radial length packaging constraints required by engine sizing and spacing limitations. The part-count for the bracket has been reduced, minimizing required maintenance and facilitating repair or replacement. A reduced part count reduces costs and eliminates needed parts, as well as saves manufacturing and installation costs. Installation of the bracket is facilitated with the channels, providing for slidable installation and maintaining compression on inward extruded hooks for the cooler. The wear attenuators having the integral attachment features eliminates the need for adhesives. The monolithic body provides a mechanically entrapped fastening system for the bracket.

The foregoing has described a surface cooler apparatus comprising an air-cooled oil cooler mounting bracket. While the present disclosure has been described with respect to a limited number of embodiments, those skilled in the art, having benefit of this disclosure, will appreciate that other embodiments can be devised which do not depart from the scope of the disclosure as described herein. While the present disclosure has been described with reference to exemplary embodiments, it will be understood by those skilled in the art that various changes can be made and equivalents can be substituted for elements thereof without departing from the scope of the disclosure. In addition, many modifications can be made to adapt a particular situation or material to the teachings of the present disclosure without departing from the essential scope thereof. For example, the mounting bracket described herein can be configured for use in many different types of aircraft engine architectures, in addition to the example engine describe herein, such as, but not limited to a multi-spool design (additional compressor and turbine section), a geared turbo fan type architecture, engines including un-ducted fans, single shaft engine designs (single compressor and turbine sections), or the like. In addition, the mounting bracket disclosed herein will work equally well with other types of air-cooled oil coolers, and as such is not intended to be limited to surface coolers, and can be configured for use in other cooler types, such as plate and fin, tube-fin types, or the like would benefit as well. Therefore, it is intended that the present disclosure not be limited to the particular embodiment disclosed as the best mode contemplated for carrying out the disclosure. It is, therefore, to be understood that the appended claims are intended to cover all such modifications and changes as fall within the true spirit of the disclosure.

It should be appreciated that the mounting bracket as described herein provides for fixed dynamic loading and high cycle fatigue for the surface cooler at the fan casing, while remaining flexible to permit thermal growth in the axial and circumferential direction. The mounting bracket includes a fewer number of parts, as compared to typical mounting brackets for surface coolers. The mounting bracket is easily producible, installable, and reduces manufacturing cost. The preload provided by the wear attenuators and the vibration attenuators as described eliminates the need for adhesives to secure the brackets to the surface cooler or adhesives to form the mounting bracket itself. Additionally, the bracket provides for decreased engine weight.

To the extent not already described, the different features and structures of the various embodiments can be used in combination with each other as desired. That one feature is not illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fan casing assembly comprising:
   a fan casing having a peripheral wall;
   a surface cooler having a first surface confronting the peripheral wall and a forward projection comprising a first hook radially spaced from the first surface and an aft projection comprising a second hook radially spaced from the first surface, the first hook and the second hook located between the peripheral wall and the first surface;
   a mounting bracket comprising a monolithic body having a first axial edge having a first channel and second axial edge spaced from the first axial edge where the second axial edge includes a second channel, and an aperture formed in at least one of the first channel and the second channel; and
   a set of wear attenuators comprising an elongated body having an integral attachment feature defined by a protrusion for fastening the set of wear attenuators to the bracket body by engaging the aperture.

2. The fan casing assembly of claim 1 wherein the monolithic body is slideably engaged with the surface cooler, sandwiched between the fan casing and the surface cooler, and affixed to the peripheral wall by at least one fastener centrally located on the monolithic body, and wherein the first channel retains the first hook and the second channel retains the second hook to mount the surface cooler to the fan casing.

3. The fan casing assembly of claim 1 wherein the mounting bracket further includes a set of wear attenuators wherein a wear attenuator of the set of wear attenuators is located between the first channel and second channel and the respective forward and aft projections.

4. The fan casing assembly of claim 3 wherein the wear attenuator includes an elongated body having an exterior surface and a U-shaped interior surface that is configured to be located about the forward projection or the aft projection.

5. The fan casing assembly of claim 4 wherein the wear attenuator is made from PEEK.

6. The fan casing assembly of claim 4 wherein the wear attenuator further comprises at least one protrusion configured to engage a portion of the monolithic body.

7. The fan casing assembly of claim 6 wherein the at least one protrusion and portion of the monolithic body form a snap-fit attachment.

8. The fan casing assembly of claim 3, further comprising a vibration attenuator located between at least a portion of the wear attenuator and the monolithic body.

9. A surface cooler bracket configured to mount a surface cooler to a fan casing by retaining a first hook and a second hook extending from the surface cooler, the surface cooler bracket comprising:
   a bracket body configured to extend between the first hook and the second hook, the bracket body having a first axial edge having a first channel, a second axial edge spaced from the first axial edge where the second axial edge includes a second channel, and an aperture formed in at least one of the first channel and the second channel; and
   a set of wear attenuators wherein a wear attenuator of the set of wear attenuators is located within the first channel or the second channel and where the wear attenuator comprises an elongated body having an integral attachment feature defined by a protrusion configured to fasten the wear attenuator to the bracket body by engaging the aperture.

10. The surface cooler bracket of claim 9 wherein the elongated body further comprises a U-shaped interior surface that is configured to be located about the first hook or second hook extending from the surface cooler.

11. The surface cooler bracket of claim 9 wherein the protrusion and portion of the bracket body form a snap-fit attachment.

12. The surface cooler bracket of claim 9, further comprising a vibration attenuator located between at least a portion of the wear attenuator and the bracket body.

13. The surface cooler bracket of claim 9 wherein the elongated body further comprises end walls configured to prevent sliding of the wear attenuator within the bracket body.

14. The surface cooler bracket of claim 9 wherein the bracket body further comprises end walls configured to retain the wear attenuator.

15. A surface cooler bracket for mounting a surface cooler to a casing at fan casing fastener openings for a turbine engine, the surface cooler bracket comprising:
   a monolithic bracket body having a first axial edge having a first channel and second axial edge spaced form the first axial edge where the second axial edge includes a second channel, an aperture formed in at least one of the first channel and the second channel, and at least one mounting bracket fastener opening corresponding to the fan casing fastener opening; and
   a set of wear attenuators wherein a wear attenuator of the set of wear attenuators is located within the first channel or the second channel and where the wear attenuator comprises an elongated body having an integral attachment feature defined by a protrusion for fastening the wear attenuator to the bracket body by engaging the aperture, wherein the integral attachment feature is a mechanical fastening.

16. The surface cooler bracket of claim 15 wherein the monolithic body is slideably engaged with the surface cooler, sandwiched between the fan casing and the surface cooler, and affixed to a peripheral wall by at least one fastener centrally located on the monolithic body.

17. The surface cooler bracket of claim 16 wherein the set of wear attenuators includes a first wear attenuator located within the first channel, including the integral attachment feature, and defining a first slot and a second wear attenuator located within the second channel, including the integral attachment feature, and defining a second slot.

18. The surface cooler bracket of claim 17 wherein the first wear attenuator and the second wear attenuator are pre-loaded to compressively retain the surface cooler at the first and second channels.

19. The surface cooler bracket of claim 17, further comprising at least one vibration attenuator located between at least a portion of the first or second wear attenuator and the bracket body.

20. The surface cooler bracket of claim 15 wherein the monolithic body is slideably engaged with the surface cooler, sandwiched between the fan casing and the surface cooler, and affixed to a peripheral wall by at least one fastener centrally located on the monolithic body.

* * * * *